United States Patent
Bellon et al.

(10) Patent No.: US 11,206,145 B2
(45) Date of Patent: Dec. 21, 2021

(54) INTEGRATED CIRCUIT PERSONALISATION

(71) Applicant: NAGRAVISION S.A., Cheseaux-sur-Lausanne (CH)

(72) Inventors: Sebastien Bellon, Cheseaux-sur-Lausanne (CH); Claudio Favi, Cheseaux-sur-Lausanne (CH); Roan Hautier, Cheseaux-sur-Lausanne (CH); Marco Macchetti, Cheseaux-sur-Lausanne (CH); Jerome Perrine, Cheseaux-sur-Lausanne (CH)

(73) Assignee: NAGRAVISION S.A., Cheseaux-sur-Lausanne (CH)

( * ) Notice: Subject to any disclaimer, the term of this patent is extended or adjusted under 35 U.S.C. 154(b) by 0 days.

(21) Appl. No.: 16/763,121

(22) PCT Filed: Nov. 12, 2018

(86) PCT No.: PCT/EP2018/080972
§ 371 (c)(1),
(2) Date: May 11, 2020

(87) PCT Pub. No.: WO2019/096748
PCT Pub. Date: May 23, 2019

(65) Prior Publication Data
US 2020/0396090 A1  Dec. 17, 2020

(30) Foreign Application Priority Data
Nov. 14, 2017 (EP) .................................... 17201496

(51) Int. Cl.
*G06F 11/30* (2006.01)
*H04L 9/32* (2006.01)
(Continued)

(52) U.S. Cl.
CPC .......... *H04L 9/3278* (2013.01); *G06F 21/602* (2013.01)

(58) Field of Classification Search
CPC ............................ H04L 9/3278; G06F 21/602
See application file for complete search history.

(56) References Cited

U.S. PATENT DOCUMENTS

| 7,941,673 | B1 * | 5/2011 | Trimberger | ........... | H04L 9/0866 |
| | | | | | 713/189 |
| 8,983,073 | B1 * | 3/2015 | Peterson | ............... | G06F 21/629 |
| | | | | | 380/277 |

(Continued)

*Primary Examiner* — Gary S Gracia
(74) *Attorney, Agent, or Firm* — Oblon, McClelland, Maier & Neustadt, L.L.P.

(57) ABSTRACT

An integrated circuit and a method of configuring a plurality of integrated circuits are disclosed. Each integrated circuit comprises a cryptographic key specific to it. Each integrated circuit comprises a cryptographic key specific to it. Each cryptographic key can be generated on the respective integrated circuit using a physical unclonable function and data associated with the cryptographic key, e.g. a configuration message comprising instructions for generating the cryptographic key using the physical unclonable function. The cryptographic key specific to the integrated circuit is not stored on the integrated circuit. Each of the plurality of integrated circuits are configured using a data file that is encrypted with the respective cryptographic key specific to the integrated circuit, circuit.

14 Claims, 8 Drawing Sheets

(51) Int. Cl.
    *G06F 21/60*     (2013.01)
    *G06F 12/14*     (2006.01)

(56) References Cited

U.S. PATENT DOCUMENTS

| | | | |
|---|---|---|---|
| 2006/0039306 A1* | 2/2006 | Iyer | H04W 12/0471 370/310 |
| 2009/0132821 A1* | 5/2009 | Matsuzaki | H04L 9/3247 713/170 |
| 2013/0254636 A1* | 9/2013 | Kirkpatrick | H04L 9/0866 714/784 |
| 2014/0225639 A1* | 8/2014 | Guo | H04L 9/0866 326/8 |
| 2015/0058928 A1* | 2/2015 | Guo | H04L 63/0876 726/3 |
| 2015/0072447 A1* | 3/2015 | Shen-Orr | H01L 23/576 438/17 |
| 2015/0178143 A1* | 6/2015 | Mathew | G06F 7/00 714/5.1 |
| 2016/0227348 A1* | 8/2016 | Guo | G06F 21/6218 |
| 2016/0364582 A1* | 12/2016 | Cammarota | H04L 9/3278 |
| 2017/0279606 A1* | 9/2017 | Kara-Ivanov | G06F 21/6209 |
| 2018/0006830 A1* | 1/2018 | Cambou | G06F 11/2268 |

\* cited by examiner

INTEGRATED CIRCUIT PERSONALISATION

FIELD

The present disclosure relates to integrated circuit personalisation. More particularly, but not exclusively, the present disclosure uses a personalisation file that is encrypted with a cryptographic key specific to an integrated circuit.

BACKGROUND

Integrated circuits are generally fabricated in a wafer comprising a plurality of integrated circuits. Typically, the set of integrated circuits are tested on wafer and upon successful testing, the set of integrated circuits are cut and packaged, for example on smart card modules or ball grid arrays to be soldered on printed circuit boards. The integrated circuits are then configured, e.g. using a personalisation file, in order to write application code and databases relating to the end user of the integrated circuit. Personalisation files generally comprise proprietary information.

Typically, personalisation of integrated circuits is carried out at a different location to fabrication and may be carried out by a party to whom the owner of the personalisation data does not wish to grant access to any proprietary information. In order to protect any proprietary information, hardware security modules provided by the owner of the personalisation data may be used to secure the personalisation file during configuration of the packaged integrated circuits. However, hardware security modules add cost and complexity to the configuration process.

BRIEF DESCRIPTION OF THE DRAWINGS

Specific embodiments are now described by way of example with reference to the drawings, in which.

DETAILED DESCRIPTION OF THE DRAWINGS

Figure 1:
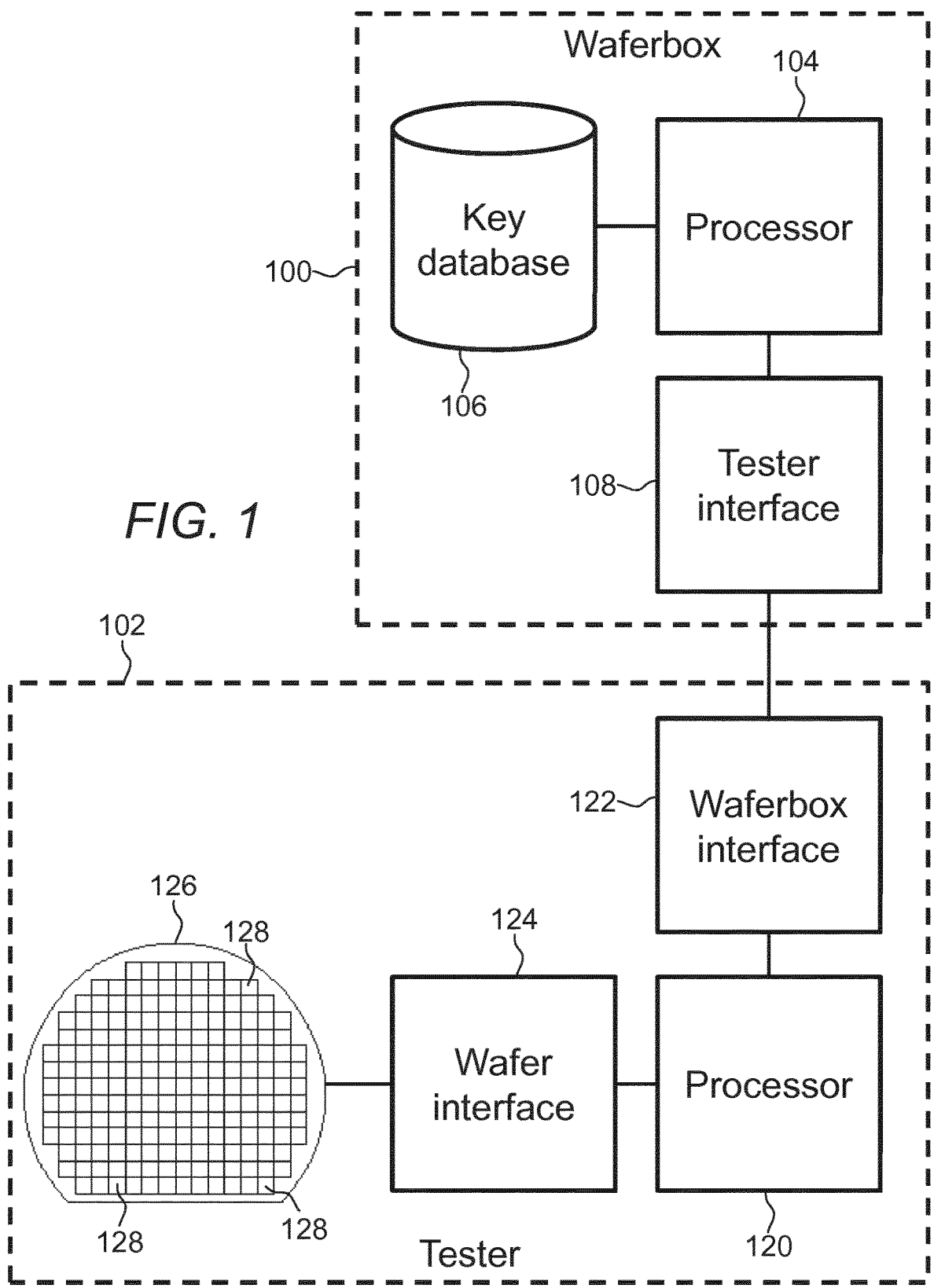
FIG. 1 illustrates an environment with a plurality of integrated circuits, each associated with a specific cryptographic key.

In overview, an integrated circuit and a method of configuring a plurality of integrated circuits are disclosed. Each integrated circuit comprises a cryptographic key specific to it. Each cryptographic key can be generated on the respective integrated circuit using a physical unclonable function and data associated with the cryptographic key, e.g. a configuration message comprising instructions for generating the cryptographic key using the physical unclonable function. The cryptographic key specific to the integrated circuit is not stored on the integrated circuit. Each of the plurality of integrated circuits are configured using a data file that is encrypted with the respective cryptographic key specific to the integrated circuit.

In some aspects of the disclosure, a method of configuring a plurality of integrated circuits comprises receiving the plurality of integrated circuits, for example at a personalization device. Each integrated circuit comprises a physical unclonable function and a memory storing data associated with a cryptographic key specific to the integrated circuit. The method comprises receiving a plurality of encrypted files. Each encrypted file is encrypted with the cryptographic key specific to a respective one of the plurality of integrated circuits. The method comprises, for each encrypted file of the plurality of encrypted files, sending the encrypted file to the respective integrated circuit. The method further comprises, for each encrypted file of the plurality of encrypted files, causing the respective integrated circuit to generate its cryptographic key using its data associated with the cryptographic key and its physical unclonable function. For each encrypted file of the plurality of encrypted files, the respective integrated circuit is caused to decrypt the encrypted file using its generated cryptographic key, and the decrypted file is used to configure the respective integrated circuit.

As each encrypted file is specific to one integrated circuit, the encrypted file cannot be used to configure integrated circuits other than the "matching" one, i.e. the integrated circuit arranged to generate the corresponding cryptographic key. Further, as the cryptographic key specific to the integrated circuit is not stored on the integrated circuit, the cryptographic key cannot be read from the memory of the integrated circuit to decrypt the encrypted file externally from the integrated circuit. Even if the memory of the integrated circuit was read to retrieve any stored data, for example the data associated with the cryptographic key specific to the integrated circuit, the cryptographic key could not be determined as it is not directly stored on the integrated circuit. The cryptographic key can also not be recovered on a different integrated circuit using the data, as the data used with a different physical unclonable function of a different integrated circuit will not produce the correct key for decrypting the encrypted personalisation file for that integrated circuit. Accordingly, any data in the encrypted file, such as proprietary application data, is protected from unauthorised access by a party that has access to the encrypted files. Additionally, the encrypted file also cannot be used to personalise additional copies of integrated circuits, thus allowing the number of personalised integrated circuits to be controlled.

Further aspects of the disclosure relate to a system comprising a processor configured to perform the steps of the method described above, a non-transitory computer readable medium having computer-executable instructions to cause a computer system to perform the steps of the method as described above, and a computer program product comprising instructions which, when the program is executed by a computer, cause the computer to carry out the steps of the method as described above.

In some aspects of the disclosure, an integrated circuit comprises a physical unclonable function, a memory storing data associated with a cryptographic key and a processor. The processor is configured to receive an encrypted file, the encrypted file being encrypted with the cryptographic key. The processor is configured to generate the cryptographic key using the physical unclonable function, and decrypt the encrypted file using cryptographic key. The processor is configured to use the decrypted file to configure the integrated circuit.

A physical unclonable function is a function that takes advantage of the random variations in the components of an integrated circuit, such as ring oscillators, by determining one or more physical quantities of these electronic components. Physical unclonable function are very difficult or even impossible to clone, for example by creating a function that would constitute a particular predefined identifier, mainly because the value derived from such a function is impossible to predict and/or to reproduce and is specific to the physical properties of the substrate in which it is incorporated.

With reference to FIG. 1, a waferbox 100 is connected to a tester 102. The waferbox 100 comprises a processor 104, a cryptographic key database 106 and a tester interface 108. The waferbox 100 is arranged to manage communications with wafers via the tester 102 and to execute pre-programmed tasks. The processor 104 is configured to coordinate between the cryptographic key database 106 and the tester interface 108. The cryptographic key database 106 comprises a plurality of cryptographic keys. The cryptographic key database 106 is populated with predetermined cryptographic keys and/or cryptographic keys received from the integrated circuits, as described with reference to FIG. 3. The tester interface 108 is arranged to communicate with the tester 102.

The tester 102 comprises a processor 120, a waferbox interface 122, a wafer interface 124 and a wafer 126. The processor 120 is configured to coordinate between the waferbox interface 122 and the wafer interface 124. The waferbox interface 122 is arranged to communicate with the waferbox 100 via the tester interface 108. The wafer interface 124 is arranged to communicate between the wafer interface 124 and the wafer 126. In "normal" use, the tester 102 is arranged to probe each of the integrated circuits 128 that are present on the wafer 126, for example by applying predetermined test patterns to the integrated circuits 128 to test for any functional defects.

The wafer 126 comprises a plurality of integrated circuits 128. Each integrated circuit 128 comprises a physical unclonable function and a memory, for example a non-volatile memory. Each of the plurality of integrated circuits 128 is associated with a respective cryptographic key. The cryptographic key specific to an integrated circuit is not stored on the integrated circuit. Instead, for each integrated circuit, a configuration message is stored in the memory of the integrated circuit. The configuration message is arranged such that when processed by the physical unclonable function of the integrated circuit 128, the cryptographic key specific to an integrated circuit is generated. For example, the physical unclonable function may comprise a plurality of ring oscillators such that challenge-response pairs of ring oscillators can be used to generate the assigned cryptographic key, e.g. 128 challenge-response pairs for a 128-bit cryptographic key or 256 challenge-response pairs for a 256-bit cryptographic key, and the configuration message may comprise a sequence of challenge-response pairs required to generate the cryptographic key.

It is to be noted that ring-oscillators RO-PUF are a non-limiting example, and any other means such as Delay-PUF, Butterfly PUF, SRAM-PUF, etc. . . . could be used.

In some embodiments, a cryptographic key is assigned to each integrated circuit 128 as described in US2014/0376717 or EP2816757 which are both incorporated herein in their entirety.

In some embodiments, a cryptographic key is assigned to each integrated circuit 128, and each configuration message is determined for the respective integrated circuit, as described with reference to FIG. 2. Assignment of the cryptographic keys may be carried out during wafer testing of the wafer 126 when the wafer is fabricated.

Figure 2:
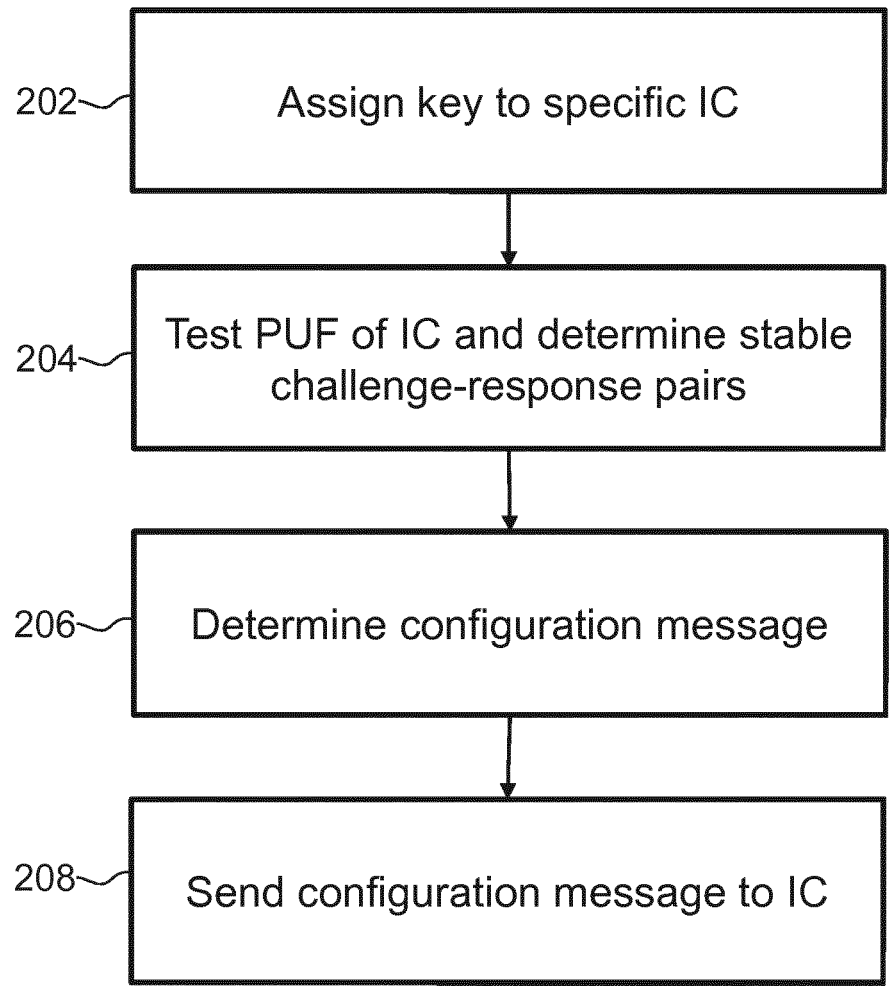
FIG. 2 illustrates a flow chart of a method of associating a specific cryptographic key to each integrated circuit.

With reference to FIG. 2, at step 202, the processor 104 of the waferbox 100 assigns a cryptographic key from the key database 106 to each integrated circuit. The key database 106 may be updated to comprise information, such as an identifier, e.g. serial number or cryptographic hash of the cryptographic key, of the integrated circuit that has been assigned each cryptographic key.

At step 204, the waferbox 100 tests the physical unclonable function of each integrated circuit 128 to determine stable challenge-response pairs of the components of the physical unclonable function. Stable challenge-response pairs consistently yield the same response when challenged. At step 206, the processor 104 of the waferbox 100 determines a configuration message comprising a sequence of stable challenge-response pairs of ring oscillators required to generate the assigned cryptographic key. In this way, the configuration message can later be processed by the physical unclonable function to consistently generate the cryptographic key specific to the integrated circuit. At step 208, the waferbox 100 sends the configuration messages to the respective integrated circuit, and causes each integrated circuit 128 to store its configuration message in its memory.

In other embodiments, once the integrated circuit is assigned a cryptographic key, the key is sent to the corresponding integrated circuit. Each integrated circuit then determines stable challenge-response pairs of the components of its physical unclonable function. Then each integrated circuit determines the configuration message required to generate its assigned cryptographic key. In other words, steps 204 and 206 may be carried out by each processor of the integrated circuits, rather than the waferbox 100.

Alternatively, the configuration message may be randomly generated for each integrated circuit, and used to generate a cryptographic key, as described with reference to FIG. 3. Generation of the cryptographic keys may be carried out during wafer testing of the wafer 126 when the wafer is fabricated.

Figure 3:
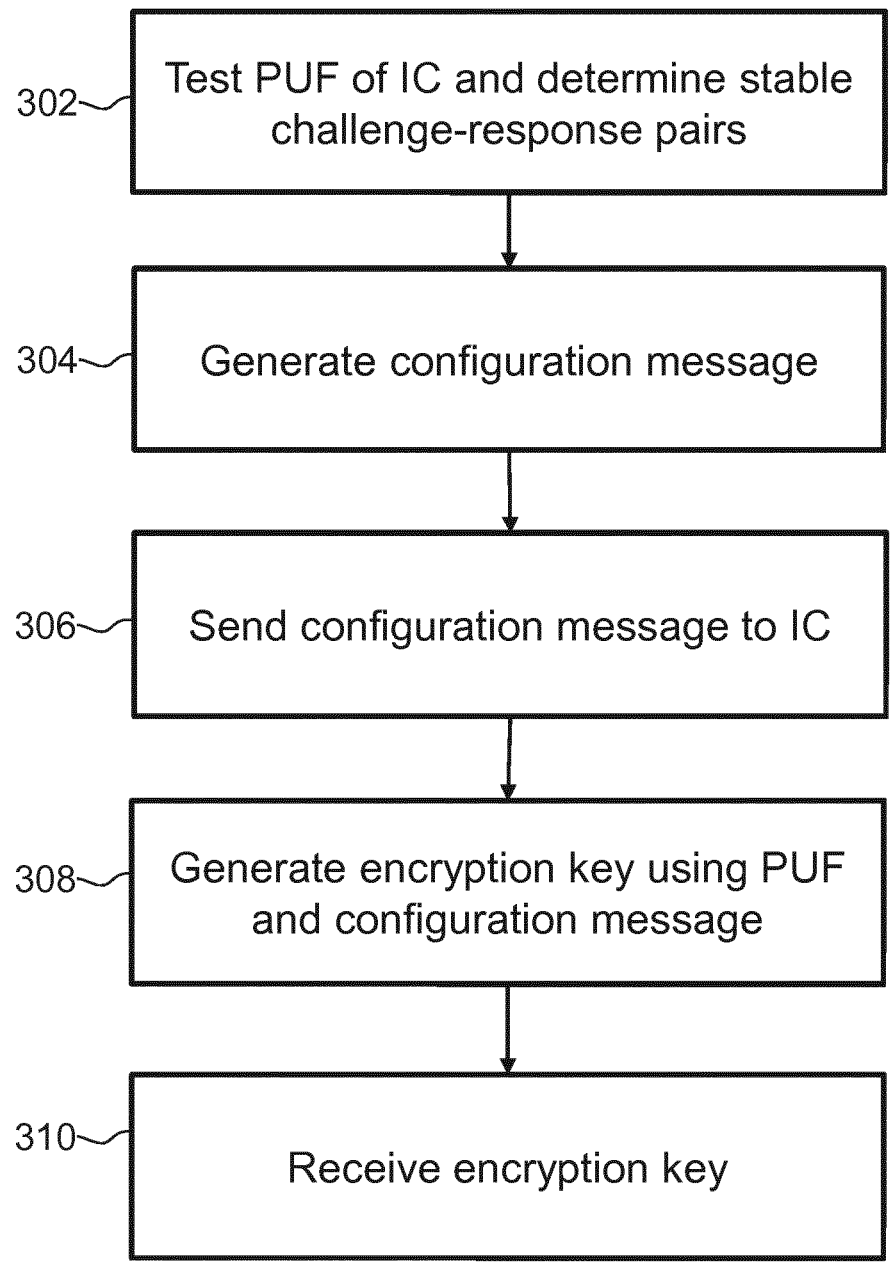
FIG. 3 illustrates a flow chart of another method of associating a specific cryptographic key to each integrated circuit.

With reference to FIG. 3, at step 302, the waferbox 100 tests the physical unclonable function of each integrated circuit 128 to determine stable challenge-response pairs of the components of the physical unclonable function. Stable challenge-response pairs consistently yield the same response when challenged. At step 304, the processor 104 of the waferbox 100 determines a configuration message for each integrated circuit comprising a random sequence of stable challenge-response pairs. At step 306, the waferbox 100 sends each configuration message to its respective integrated circuit. At optional step 308, the waferbox 100 causes each integrated circuit 128 to generate its specific cryptographic key by processing the received configuration message using its physical unclonable function. At optional step 310, the waferbox 100 causes each integrated circuit 128 to send its specific cryptographic key generated at step 308 to the waferbox 100, and the waferbox 100 receives the generated cryptographic keys. The waferbox 100 stores each cryptographic key in the key database 106.

In other embodiments, instead of the steps 302 and 304 being carried out by the waferbox 100, each integrated circuit determines stable challenge-response pairs of the components of its physical unclonable function, then determines a configuration message comprising a random sequence of stable challenge-response pairs. The steps 308 to 310 are then carried out as above to generate and store the cryptographic key specific to each of the plurality of integrated circuit.

The cryptographic key specific to each of the plurality of integrated circuit 128 is used to encrypt a respective personalisation file for each integrated circuit. The personalisation file comprises application data to enable the integrated circuit to be used, for example, as a payment smart card or a smart card for a television set-top box. The personalisation file may be encrypted by an encryptor.

Figure 4:
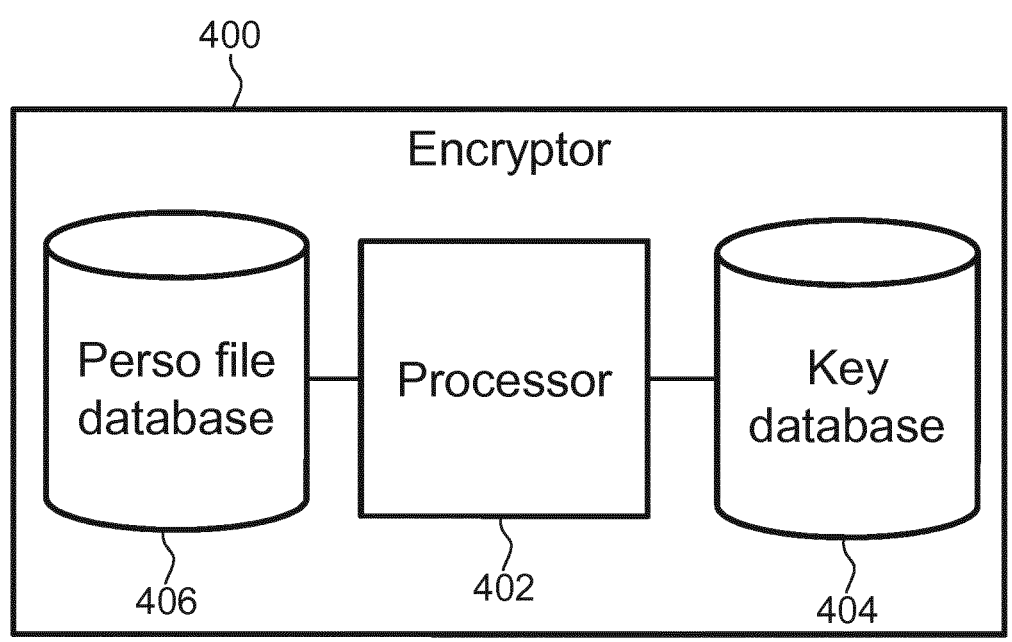
FIG. 4 illustrates an environment in which a personalisation file is encrypted.

With reference to FIG. 4, an encryptor 400 comprises a processor 402, a key database 404 and a personalisation file database 406. The processor 402 is configured to coordinate between the key database 404 and the personalisation file database 406. The key database 404 comprises the cryptographic keys specific to each of the plurality of integrated circuits 128, and may be a copy of the key database 106 of the waferbox 100. For example, the key database 106 of the waferbox 100 may be copied to the key database 404 of the encryptor 400 using the internet or via a non-transitory computer readable storage medium. The personalisation file database 406 comprises a personalisation file to be encrypted, as well as encrypted versions of the personalisation file. Each personalisation file comprises data common for all integrated circuits, and data specific to each integrated circuit.

Figure 5:
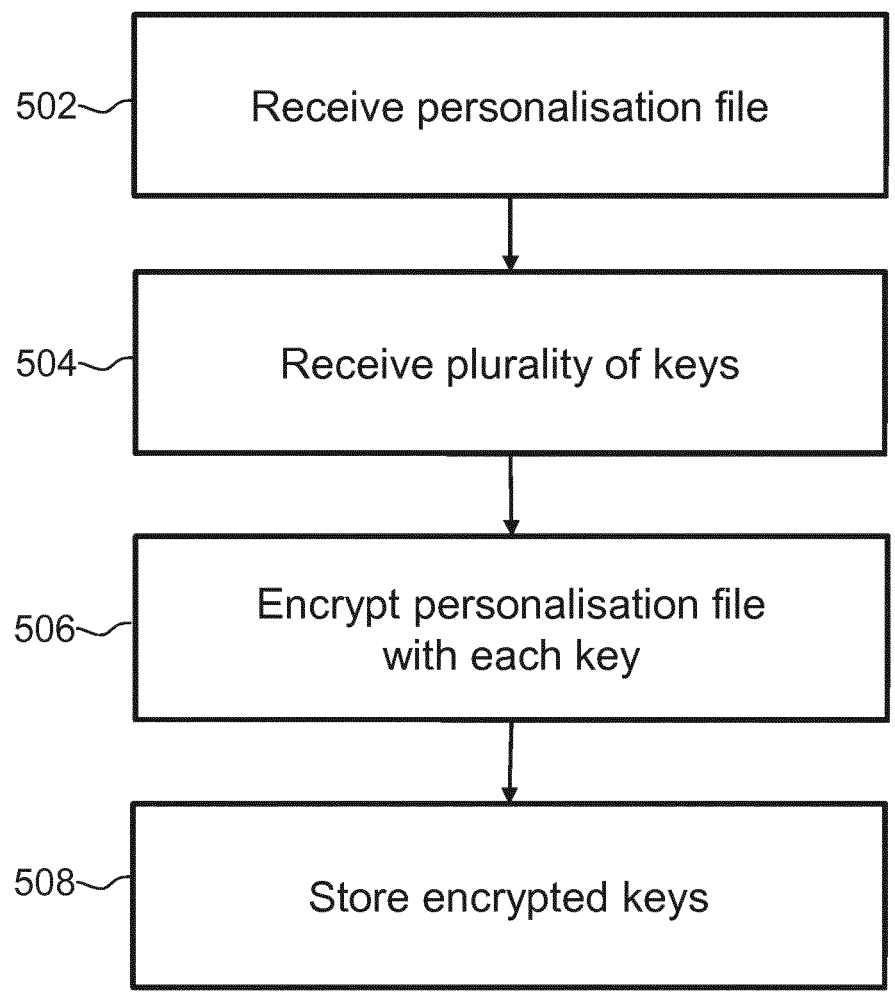
FIG. 5 illustrates a flow chart of a method of generating a plurality of encrypted personalisation files.

With reference to FIG. 5, a process for encrypting a personalisation file is described. At step 502, the processor 402 of the encryptor 400 receives the personalisation file to be encrypted from the personalisation file database 406. At step 504, the processor 402 receives a plurality of cryptographic keys from the key database 404. At step 506, the processor 402 creates different encrypted versions of the personalisation file, in which each version is encrypted with a respective cryptographic key. At step 508, the different versions of the encrypted personalisation file are stored in the personalisation file database 406. The different versions of the encrypted personalisation file may be associated and stored with an identifier of the specific integrated circuit that the version is for.

The encrypted personalisation files may then be distributed, for example to a personalisation device or service provider for personalising integrated circuits. The encryption protects any data, such as a proprietary application, proprietary encryption keys and the like in the personalisation file from unauthorised access.

Figure 6:
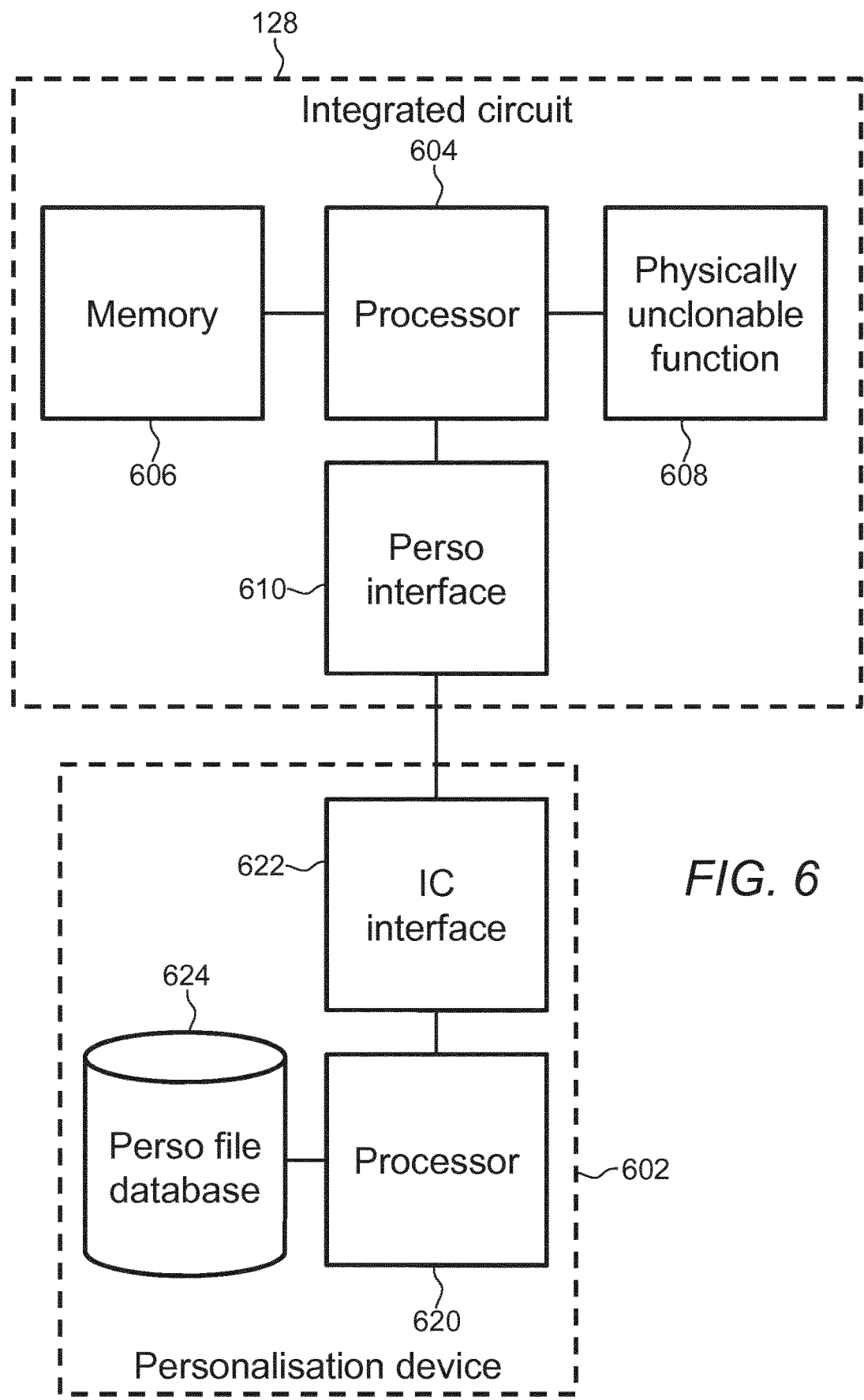
FIG. 6 illustrates an environment in which an integrated circuit is configured.

With reference to FIG. 6, a personalisation device 602 is connected to an integrated circuit 128. The integrated circuit 128 comprises a processor 604, a memory 606, a physical unclonable function 608 and a personalisation device interface 610. The processor 604 is configured to coordinate between the memory 606, the physical unclonable function 608 and the personalisation device interface 610. The memory 606 is arranged to store a configuration message which when processed by the physical unclonable function 608 generates a cryptographic key specific to the integrated circuit. In some embodiments, the memory 606 is distributed between different physical memory circuits, or the same or different types.

The personalisation device interface 610 is arranged to communicate with the personalisation device 602. In other embodiments, the integrated circuit 128 comprises a general-purpose input/output to communicate with the personalisation device 602. In some embodiments, the integrated circuit 128 may be cut from the wafer 126 and packaged in a smart card or other container before connecting to the personalisation device 602.

The personalisation device comprises a processor 620, an integrated circuit interface 622 and a personalisation file database 624. The processor 620 is configured to coordinate between the integrated circuit interface 622 and the personalisation file database 624. The personalisation file database 624 comprises encrypted versions of a personalisation file. The encrypted versions of a personalisation file may be obtained from the personalisation file database 406 of the encryptor 400 using the internet or via a non-transitory computer readable storage medium. The personalisation file database 624 does not comprise an unencrypted version of the personalisation file. The integrated circuit interface 622 is arranged to communicate with the integrated circuit 128. The personalisation device 602 may be arranged to configure one integrated circuit at a time, or a plurality of integrated circuits simultaneously.

Figure 7:
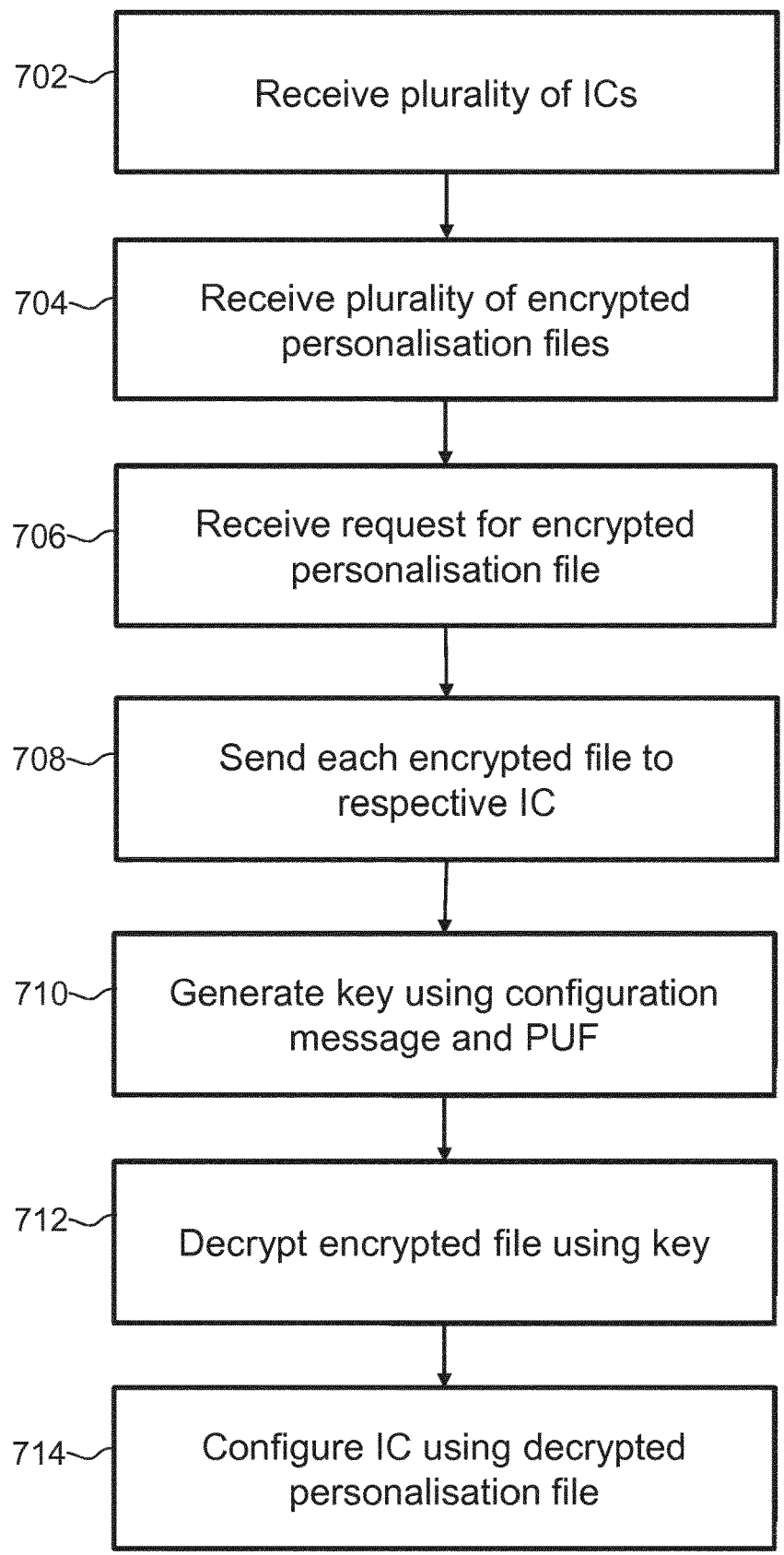
FIG. 7 illustrates a flow chart of a method of configuring an integrated circuit.

With reference to FIG. 7, a process of configuring a plurality of integrated circuit 128 is described. At step 702, the plurality of integrated circuits is received at the integrated circuit interface 622 of the personalisation device 602, i.e. the integrated circuits 128 are connected, one at a time, a few at a time or all at the same time, to the personalisation device 602. At step 704, a plurality of encrypted personalisation files is received at the personalisation device 602, and stored in the personalisation file database 624. The plurality of encrypted personalisation files each correspond to a respective one of the plurality of integrated circuits with regards to an encryption key. In other words, each different encrypted personalisation file is encrypted with the encryption key that can be generated by a respective one of the plurality of integrated circuits.

At step 706, the personalisation device 602 communicates with each integrated circuit and receives a request from each integrated circuit for its corresponding encrypted personalisation file. The request may comprise an identifier of the respective integrated circuit which the processor 620 of the personalisation device 602 can look up in the personalisation file database 624 to retrieve the associated encrypted personalisation file. In other embodiments, the personalisation device 602 device sends all of the versions of the encrypted file to each integrated circuit, and the integrated circuit determines which version it is able to decrypt.

At step 708, the personalisation device 602 sends each of the plurality of encrypted personalisation files to its respective integrated circuit 128. At step 710, the personalisation device 602 causes each integrated circuit 128 to generate its specific encryption key using its configuration message stored in its memory 606 and physical unclonable function 608. At step 712, the personalisation device 602 causes each integrated circuit 128 to decrypt the encrypted personalisation file sent to it in step 708 using the encryption key it generated in step 810. At step 714, the personalisation device 602 causes each integrated circuit 128 to configure itself in accordance with the personalisation file.

Accordingly, the personalisation file is decrypted on each integrated circuit 128. Even if the configuration message was inspected from the memory 606 of the integrated circuit 128, the cryptographic key could not be read as it is not directly stored on the integrated circuit and the physical unclonable function are difficult to identically replicate. Further, as each encrypted personalisation file is specific to one integrated circuit, the encrypted personalisation file cannot be used to configure integrated circuits other than that comprising the corresponding configuration message and physical unclonable function, thus allowing the number of personalised integrated circuits to be controlled, for example by distributing only the number of encrypted personalisation files required to produce the desired number of personalised integrated circuits.

Figure 8:
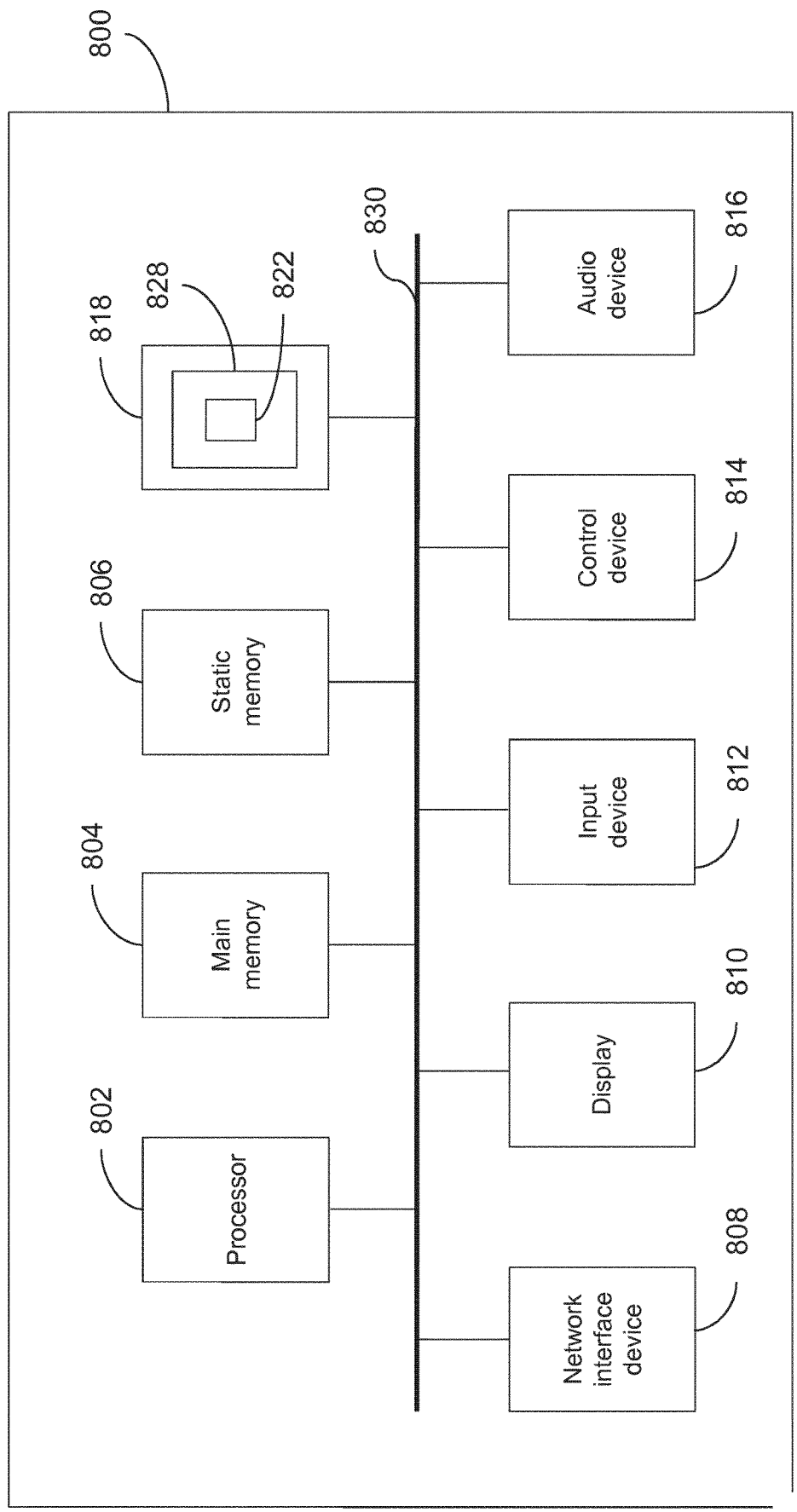
FIG. 8 illustrates a block diagram of one implementation of a computing device.

FIG. 8 illustrates a block diagram of one implementation of a computing device 800 within which a set of instructions, for causing the computing device to perform any one or more of the methodologies discussed herein, may be executed. In alternative implementations, the computing device may be connected (e.g., networked) to other machines in a Local Area Network (LAN), an intranet, an extranet, or the Internet. The computing device may operate in the capacity of a server or a client machine in a client-server network environment, or as a peer machine in a peer-to-peer (or distributed) network environment. The computing device may be a personal computer (PC), a tablet computer, a set-top box (STB), a web appliance, a server, a network router, switch or bridge, or any machine capable of executing a set of instructions (sequential or otherwise) that specify actions to be taken by that machine. Further, while only a single computing device is illustrated, the term "computing device" shall also be taken to include any collection of machines (e.g., computers) that individually or jointly execute a set (or multiple sets) of instructions to perform any one or more of the methodologies discussed herein.

The example computing device 800 includes a processing device 802, a main memory 804 (e.g., read-only memory (ROM), flash memory, dynamic random-access memory (DRAM) such as synchronous DRAM (SDRAM) or Rambus DRAM (RDRAM), etc.), a static memory 806 (e.g., flash memory, static random-access memory (SRAM), etc.), and a secondary memory (e.g., a data storage device 818), which communicate with each other via a bus 830.

Processing device 802 represents one or more general-purpose processors such as a microprocessor, central processing unit, or the like. More particularly, the processing device 802 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. Processing device 802 is configured to execute the processing logic (instructions 822) for performing the operations and steps discussed herein.

The computing device 800 may further include a network interface device 808. The computing device 800 also may include a video display unit 810 (e.g., a liquid crystal display (LCD)), an alphanumeric input device 812 (e.g., a keyboard or touchscreen), a cursor control device 814 (e.g., a mouse or touchscreen), and an audio device 816 (e.g., a speaker).

The data storage device 818 may include one or more machine-readable storage media (or more specifically one or more non-transitory computer-readable storage media) 828 on which is stored one or more sets of instructions 822 embodying any one or more of the methodologies or functions described herein. The instructions 822 may also reside, completely or at least partially, within the main memory 804 and/or within the processing device 802 during execution thereof by the computer system 800, the main memory 804 and the processing device 802 also constituting computer-readable storage media.

The various methods described above may be implemented by a computer program. The computer program may include computer code arranged to instruct a computer to perform the functions of one or more of the various methods described above. The computer program and/or the code for performing such methods may be provided to an apparatus, such as a computer, on one or more computer readable media or, more generally, a computer program product. The computer readable media may be transitory or non-transitory. The one or more computer readable media could be, for example, an electronic, magnetic, optical, electromagnetic, infrared, or semiconductor system, or a propagation medium for data transmission, for example for downloading the code over the Internet. Alternatively, the one or more computer readable media could take the form of one or more physical computer readable media such as semiconductor or solid state memory, magnetic tape, a removable computer diskette, a random access memory (RAM), a read-only memory (ROM), a rigid magnetic disc, and an optical disk, such as a CD-ROM, CD-R/W, DVD or Blu-ray disc.

In an implementation, the modules, components and other features described herein can be implemented as discrete components or integrated in the functionality of hardware components such as ASICS, FPGAs, DSPs or similar devices.

A "hardware component" is a tangible (e.g., non-transitory) physical component (e.g., a set of one or more processors) capable of performing certain operations and may be configured or arranged in a certain physical manner. A hardware component may include dedicated circuitry or logic that is permanently configured to perform certain operations. A hardware component may be or include a special-purpose processor, such as a field programmable gate array (FPGA) or an ASIC. A hardware component may also include programmable logic or circuitry that is temporarily configured by software to perform certain operations.

Accordingly, the phrase "hardware component" should be understood to encompass a tangible entity that may be physically constructed, permanently configured (e.g., hardwired), or temporarily configured (e.g., programmed) to operate in a certain manner or to perform certain operations described herein.

In addition, the modules and components can be implemented as firmware or functional circuitry within hardware devices. Further, the modules and components can be implemented in any combination of hardware devices and software components, or only in software (e.g., code stored or otherwise embodied in a machine-readable medium or in a transmission medium).

Unless specifically stated otherwise, as apparent from the following discussion, it is appreciated that throughout the description, discussions utilizing terms such as "receiving", "determining", "comparing", "generating", "sending," "identifying," or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

It is to be understood that the above description is intended to be illustrative, and not restrictive. Many other implementations will be apparent to those of skill in the art upon reading and understanding the above description. Although the present disclosure has been described with reference to specific example implementations, it will be recognized that the disclosure is not limited to the implementations described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

For example, the cryptographic key specific to each integrated circuit (but not stored directly on the integrated circuit) could be used to encrypt/decrypt data intended for the integrated circuit other than the personalisation file.

The invention claimed is:

1. A method of configuring a plurality of integrated circuits, the method comprising:
receiving the plurality of integrated circuits, wherein each integrated circuit comprises a physical unclonable function and a memory storing data associated with a cryptographic key specific to the integrated circuit;
receiving a plurality of encrypted files, wherein each encrypted file is encrypted with the cryptographic key specific to a respective one of the plurality of integrated circuits; and
for each encrypted file of the plurality of encrypted files:
sending the encrypted file to the respective integrated circuit;
causing the respective integrated circuit to generate its cryptographic key using its data associated with the cryptographic key and its physical unclonable function;
causing the respective integrated circuit to decrypt the encrypted file using its generated cryptographic key; and
using the decrypted file to configure the respective integrated circuit.

2. The method of claim 1, wherein using the decrypted file to configure the respective integrated circuit comprises storing the decrypted file in the memory of the integrated circuit.

3. The method of claim 1, wherein using the decrypted file to configured the respective integrated circuit comprises determining data for configuring the integrated circuit, and storing the data for configuring the integrated circuit in the memory of the integrated circuit.

4. The method of claim 1, wherein the physical unclonable function comprises a plurality of ring oscillators and the data associated with the cryptographic key specific to the integrated circuit comprises a sequence of challenge-response pairs of the plurality of ring oscillators.

5. The method of claim 1, comprising, prior to sending the encrypted file to the respective integrated circuit, receiving, from each encrypted file of the plurality of encrypted files, a request for the encrypted file specific to the respective integrated circuit.

6. One or more non-transitory computer readable medium having computer-executable instructions to cause a computer system to perform the steps of the method of claim 1.

7. A system for configuring a plurality of integrated circuits, the system comprising:
an integrated circuit interface configured to receive a plurality of integrated circuits, wherein each integrated circuit comprises a physical unclonable function and a memory storing data associated with a cryptographic key specific to the integrated circuit;
a memory circuit configured to store a personalization file database comprising a plurality of encrypted files, wherein each encrypted file is encrypted with the cryptographic key specific to a respective one of the plurality of integrated circuits; and
a processing circuit coupled to the memory circuit and configured to, for each encrypted file of the plurality of encrypted files:
send the encrypted file to the respective integrated circuit;
cause the respective integrated circuit to generate its cryptographic key using its data associated with the cryptographic key and its physical unclonable function;
cause the respective integrated circuit to decrypt the encrypted file using its generated cryptographic key; and
use the decrypted file to configure the respective integrated circuit.

8. The system of claim 7, wherein using the decrypted file to configured to respective integrated circuit comprises storing the decrypted file in the memory of the integrated circuit.

9. The system of claim 7, wherein using the decrypted file to configure the respective integrated circuit comprises determining data for configuring the integrated circuit, and storing the data for configuring the integrated circuit in the memory of the integrated circuit.

10. The system of claim 7, wherein the physical unclonable function comprises a plurality of ring oscillators and the data associated with the cryptographic key specific to the integrated circuit comprises a sequence of challenge-response pairs of the plurality of ring oscillator.

11. The system of claim 7, wherein the processing circuit is configured to, prior to sending the encrypted file to the respective integrated circuit, receive, from each encrypted file of the plurality of encrypted files, a request for the encrypted file specific to the respective integrated circuit.

12. An integrated circuit comprising:
a physical unclonable function;
a memory circuit configured to store data associated with a cryptographic key; and
a processing circuit configured to:
receive an encrypted file, wherein the encrypted file is encrypted with the cryptographic key;
generate the cryptographic key using the physical unclonable function and the data associated with the cryptographic key;
decrypt the encrypted file using cryptographic key; and
use the decrypted file to configure the integrated circuit;
wherein the physical unclonable function comprises a plurality of ring oscillators and the data associated with the cryptographic key specific to the integrated circuit comprises a sequence of challenge-response pairs specific to the plurality of ring oscillators.

13. A smart card suitable for a set-top box comprising the integrated circuit of claim 12.

14. A netlist for use in manufacturing the integrated circuit of claim 12.

* * * * *